United States Patent [19]

Ono et al.

[11] 4,208,318
[45] Jun. 17, 1980

[54] METHOD FOR COLORING THERMOPLASTIC RESINS

[75] Inventors: Seibei Ono, Nagaokakyo; Koichi Shibuya, Takatsuki, both of Japan

[73] Assignee: Dainippon Ink and Chemicals, Inc., Tokyo, Japan

[21] Appl. No.: 915,006

[22] Filed: Jun. 13, 1978

[51] Int. Cl.$^2$ ............... C08K 3/04; C08K 5/42; C08K 5/56

[52] U.S. Cl. ............... 260/40 P; 260/37 NP; 260/42.21

[58] Field of Search ............... 260/40 P, 42.21, 37 NP

[56] References Cited

U.S. PATENT DOCUMENTS

| | | | |
|---|---|---|---|
| 2,875,171 | 2/1959 | Foster et al. | 260/37 NP |
| 3,532,687 | 10/1970 | Pugin et al. | 260/37 NP X |
| 3,558,551 | 1/1971 | Gilbert et al. | 260/42.21 |
| 3,708,457 | 1/1973 | Needham et al. | 260/42.21 |
| 3,909,442 | 9/1975 | Tucker et al. | 260/42.21 |

FOREIGN PATENT DOCUMENTS

49-87792 8/1974 Japan.
51-137795 11/1976 Japan.
823966 11/1959 United Kingdom.

*Primary Examiner*—Sandra M. Person

[57] ABSTRACT

A thermoplastic resin is colored with a carbon black pigment in the presence of a sulfonamide-substituted metal phthalocyanine dyestuff of the general formula

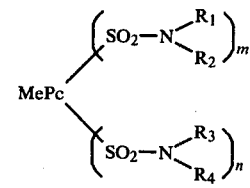

wherein MePc is a metal phthalocyanine residue, $R_1$ is a hydrogen atom or an alkyl group, $R_2$ is an alkyl group, $R_3$ is a hydrogen atom or an alkoxyalkyl group, $R_4$ is an alkoxyalkyl group, m is an integer of 0 to 4, n is an integer of 0 to 4, and m+n is an integer of 1 to 4. The use of the specified metal phthalocyanine dyestuff affords a completely black or bluish black thermoplastic resin free from a reddish hue which is inherent to coloration with carbon black.

10 Claims, No Drawings

METHOD FOR COLORING THERMOPLASTIC RESINS

This invention relates to a method for coloring a thermoplastic resin with a carbon black to obtain a black color free from a reddish hue.

Carbon black pigments, because of their superior fastness characteristics such as thermal stability, weather-ability and light resistance, find extensive use as pigments for blackening various thermoplastic resin products such as general molded articles, films and fibers. However, the color of a product colored with a carbon black pigment is black with a tint of red which is inherent to carbon black, and such a color tends to be disliked because it makes the product look cheap. In the case of textile products which tend to develop a great difference in commercial value by a subtle difference in hue, the removal of such a reddish black color is an especially important problem.

The use of a blue pigment such as Phthalocyanine Blue, Indanthrene Blue or Dianisidine Blue together with a carbon black pigment is known as a method of removing such a reddish tint caused by carbon black. The use of a titanium dioxide pigment together with carbon black is also known (British Pat. No. 823,966). However, since the blue pigment gives strong bronze peculiar to it, the reddish hue is rather increased. The titanium dioxide pigment, on the other hand, only increases blackness to some degree, and cannot remove the reddish hue.

The use of Phthalocyanine Green pigment together with carbon black is also known (Japanese Patent Publication No. 44220/76). This pigment can remove the reddish hue of carbon black almost completely. However, when the Phthalocyanine Green pigment is used in a great quantity, the resulting color becomes strongly yellowish black, and bluish black which will give depth to the color cannot be obtained. Hence, this method is not entirely satisfactory. Moreover, since the Phthalocyanine Green pigment particles are known to have a strong tendency to aggregation, a special technique is required to disperse them uniformly in a resin.

The use of a phthalimide methyl-substituted copper phthalocyanine pigment is also suggested (Japanese Laid-Open Patent Publication No. 137795/76). Although this pigment has the advantage of not giving bronze, its particles are hard and a special means is required to disperse them satisfactorily in practical application. The ratio of this pigment to be used to carbon black is also high.

It is an object of this invention therefore to provide a method for coloring a thermoplastic resin in a completely black to bluish black color with no tint of red which cannot be obtained by the use of conventional pigments.

This object has been found to be achieved by using a specified sulfonamide-substituted metal phthalocyanine dyestuff together with a carbon black pigment when coloring a thermoplastic resin with the carbon black pigment.

Thus, according to this invention, there is provided a method for coloring a thermoplastic resin with a carbon black pigment, which comprises conjointly using a sulfonamide-substituted metal phthalocyanine dyestuff expressed by the general formula

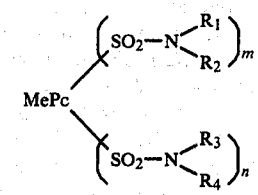

wherein MePc is a metal phthalocyanine residue, $R_1$ is a hydrogen atom or an alkyl group, $R_2$ is an alkyl group, $R_3$ is a hydrogen atom or an alkoxyalkyl group, $R_4$ is an alkoxyalkyl group, m is an integer of 0 to 4, n is an integer of 0 to 4, and m+n is an integer of 1 to 4, thereby to remove a reddish hue peculiar to coloration by carbon black.

Suitable alkyl groups for $R_1$ and $R_2$ in the above formula are those having 1 to 30 carbon atoms, preferably 1 to 18 carbon atoms. Examples of such alkyl groups include methyl, ethyl, propyl, butyl, pentyl, hexyl, cyclohexyl, octyl, decyl, tridecyl, pentadecyl, heptadecyl, eicosyl, tricosyl, and pentacosyl groups. The alkyl groups $R_1$ and $R_2$ may be the same or different. The alkoxyalkyl groups $R_3$ and $R_4$ usually have 3 to 34 carbon atoms, preferably 3 to 22 carbon atoms, in total. Those having at most 30, preferably 1 to 18, carbon atoms in the alkoxy moiety are especially suitable. Examples of such alkoxyalkyl groups include methoxyethyl, ethoxyethyl, methoxypropyl, ethoxypropyl, butoxypropyl, pentyloxypropyl, octyloxypropyl, lauryloxypropyl and stearyloxyethyl groups. The alkoxyalkyl groups $R_3$ and $R_4$ may be the same or different.

The sulfonimide-substituted metal phthalocyanine dyestuff of the above formula does not so much differ in effect depending upon the number of substituents (m+n). From the viewpoint of production, those having four substituents are most suitable.

As required, the substituted metal phthalocyanine dyestuffs of the invention may be partly substituted by about 0.5 to 8 chlorine atoms in addition to the sulfonamide groups of the above general formula.

The present invention can be applied to the coloring of thermoplastic resins which have sufficient molecular weights and flowing characteristics as to be shaped by suitable means. Examples of the thermoplastic resins are olefin polymers such as polyethylene, polypropylene, poly-1-butene, poly-1-pentene and poly-4-methyl-pentene-1; polyamides such as nylon-6, nylon-6,6, nylon-6,10, nylon-11 and nylon-12; aromatic linear polyesters such as polyethylene terephthalate, polypropylene terephthalate, polybutylene terephthalate and poly-1,4-cyclohexylene terephthalate; styrene-type polymers such as polystyrene, a copolymer of styrene and acrylonitrile (AS resin) and a terpolymer of butadiene-1,3, styrene and acrylonitrile (ABS resin); and vinyl polymers such as polyvinyl chloride, polyvinylidene chloride and polyvinyl acetate.

The substituted metal phthalocyanine is known as a blue dyestuff having superior thermal stability, solvent resistance, sublimation resistance and light resistance. The substituted metal phthalocyanine dyestuff does not show bronze inherent to the use of general blue pigments, and this is presumably the reason why it is effective for rendering the carbon black pigment used in accordance with this invention bluish in shade.

It is surprising to note that the substituted metal phthalocyanine dyestuff acts as a dispersant for carbon blacks which are known to be difficult to disperse uniformly in resins. Such an effect is not seen in any conventional pigments which give a bluish tint. Thus, even a smaller amount of such a substituted metal phthalocyanine dyestuff can give a deeper black when used together with carbon black. When the thermoplastic resin to be colored is a polyamide, an aromatic linear polyester or a styrene-type polymer such as the ones exemplified hereinabove the substituted metal phthalocyanine dyestuff disperses in the resin in the substantially dissolved state, and therefore uniform dispersion is very easy to achieve. Thus, no special dispersing means is required unlike conventional methods involving the use of such pigments as titanium dioxide, Phthalocyanine Blue, and Phthalocyanine Green. It is especially advantageous therefore to apply the present invention to such thermoplastic resins.

The substituted metal phthalocyanine dyestuff can be produced by known methods. For example, it can be prepared by dissolving a metal phthalocyanine in chlorosulfonic acid, treating the solution with thionyl chloride to obtain a metal phthalocyanine sulfonyl chloride, and reacting it with an alkylamine or an alkoxyalkylamine or a mixture of both in an aqueous medium in the presence of an acid binder such as an alkali metal hydroxide, an alkaline earth metal hydroxide, an alkali metal carbonate or pyridine. The starting metal phthalocyanine includes, for example, copper-, cobalt-, nickel-, zinc- and iron-phthalocyanines. The use of copper phthalocyanine is especially advantageous from an economical viewpoint.

The amount of the substituted phthalocyanine dyestuff of the above general formula varies greatly according to the desired color hue. Usually, it is 2 to 50% by weight based on the carbon black pigment. Generally, the use of about 5 to 8% by weight of the substituted phthalocyanine dyestuff affords a complete black color which is quite free from a reddish hue peculiar to coloration with carbon black. When the amount is about 10 to 20% by weight, a black color with a strong tint of blue is obtained. When the amount is about 20 to 50% by weight, a deep bluish black color is obtained. If the amount is less than 2% by weight, the effect intended by the present invention cannot be obtained, and if, on the other hand, it exceeds 50% by weight, the color obtained approximates blue rather than black.

Any known methods can be used to color a thermoplastic resin with a carbon black pigment and the substituted metal phthalocyanine. For example, the two colorants are added during the production of the thermoplastic resin; or the thermoplastic resin is mixed with them and the mixture is melt-kneaded under heat. It is sufficient that the carbon black pigment and the substituted metal phthalocyanine are finally divided uniformly in the thermoplastic resin. It is not always necessary therefore to use the two colorants after premixing. They may be used simultaneously without mixing, or separately at different times. For example, it is possible to form master batches separately containing the carbon black pigment and the substituted metal phthalocyanine dyestuff, add them separately to the thermoplastic resin, and melt-knead them under heat.

If desired, adjuvants such as a stabilizer or fire retardant may be added to the thermoplastic resin.

The following Examples and Comparative Examples illustrate the present invention in more detail. Unless otherwise specified, all parts and percentages are by weight.

EXAMPLES 1 AND 2 AND COMPARATIVE EXAMPLES 1 AND 2

To 20 parts of a carbon black pigment was added each of the substituted copper phthalocyanine dyestuffs shown in the following table in the amounts indicated. Furthermore, polyethylene terephthalate having an intrinsic viscosity of 0.72 was added in an amount which brought the total amount of these ingredients to 100 parts. They were uniformly mixed, and then dried at 180° C. and 0.01 mmHg for 2 hours. The mixture was extrusion-molded by a screw extruder to form a pelletized master batch.

7.5 parts of the pelletized master batch was uniformly mixed with 92.5 parts of polyethylene terephthalate. The mixture was dried for 2 hours under the same drying conditions as described above, and then spun at 290° C. to form polyester multifilaments (3 denier) containing 1.5% of carbon black.

For comparison, polyester multifilaments were prepared in the same way as above except using Phthalocyanine Blue pigment (Comparative Example 1) and Phthalocyanine Green pigment (Comparative Example 2) in the amounts indicated in the following table.

The results are tabulated below.

The "dispersibility of phthalocyanine dyestuff in polyester" given in the following table is the result of observation with a microscope (100×) of 10 mg of the colored polyester multifilaments which were interposed between two cover glass sheets, melted at 290° C. and cooled.

| Example (Ex.) or Comparative Example (CEx.) | Phthalocyanine dyestuff Type | Amount based on carbon black (%) | Color or polyester multifilaments | Dispersibility of phthalocyanine dyestuff in polyester |
|---|---|---|---|---|
| Ex. 1 | CuPc—[—SO$_2$—N(H)(CH$_2$CH(CH$_3$)CH$_3$)]$_3$ | 5 | Bluish black | Completely dissolved with no particle of the phthalocyanine dyestuff |
| | | 10 | Black with a strong tint of blue | " |
| | | 20 | Deep bluish black | " |

-continued

| Example (Ex.) or Comparative Example (CEx.) | Phthalocyanine dyestuff Type | Amount based on carbon black (%) | Color or polyester multifilaments | Dispersibility of phthalocyanine dyestuff in polyester |
| --- | --- | --- | --- | --- |
| Ex. 2 | CuPc—[—SO$_2$—N(H)(CH$_2$)$_3$OCH$_3$]$_4$ | 5 | Bluish black | " |
|  |  | 10 | Black with a strong tint of blue | " |
|  |  | 20 | Deep bluish black | " |
| CEx. 1 | Phthalocyanine Blue (C.I. Pigment Blue 15) | 20 | Reddish black with marked bronze | Many coarse particles (5–30 microns) of the phthalocyanine blue pigment |
| CEx. 2 | Phthalocyanine Green (C.I. Pigment Green 7) | 20 | Yellowish black with some bronze | Many coarse particles (5–30 microns) of the phthalocyanine green pigment |

EXAMPLE 3

Twenty parts of carbon black pigment was uniformly mixed with 80 parts of polybutylene terephthalate having an intrinsic viscosity of 0.70. The mixture was dried at 160° C. and 0.01 mmHg for 5 hours, and extrusion-molded through a screw extruder at 250° C. to form a pelletized master batch containing 20% of carbon black. 2.5 Parts of the master batch, 0.2 part of substituted copper phthalocyanine of the following formula

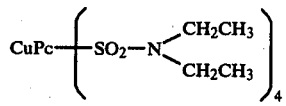

and 97.3 parts of polybutylene terephthalate having an intrinsic viscosity of 0.70 were uniformly mixed. The mixture was dried for 7 hours in a vacuum dryier at 130° C. and 0.01 mmHg, and extruded through a T-die at 260° C. to form a film having a thickness of 0.05 mm. The color of the film was black with a strong tint of blue.

EXAMPLE 4

Twenty parts of a carbon black pigment was uniformly mixed with 80 parts of polyethylene terephthalate having an intrinsic viscosity of 0.72. The mixture was extrusion-molded at 290° C. through a screw extruder to form a pelletized master batch containing 20% of carbon black.

Ten parts of the pelletized master batch, 0.2 part of substituted copper phthalocyanine dyestuff of the following formula

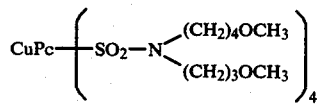

and 89.8 parts of uncolored polyethylene terephthalate having an intrinsic viscosity of 0.70 were mixed. The mixture was dried for 7 hours in a vacuum dryer at 130° C. and 0.01 mmHg, and spun and drawn in a customary manner to form polyester multifilaments having a size of 2 denier. The filaments were colored black with a strong tint of blue.

EXAMPLE 5

Twenty parts of a carbon black pigment, 2 parts of substituted copper phthalocyanine dyestuff of the following formula

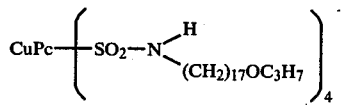

and 78 parts of polyethylene terephthalate having an intrinsic viscosity of 0.65 were uniformly mixed. The mixture was dried for 7 hours in a vacuum dryer at 130° C. and 0.01 mmHg, and extrusion-molded through a screw extruder to form a pelletized master batch.

2.5 Parts of this pelletized master batch and 97.5 parts of polyethylene terephthalate having an intrinsic viscosity of 0.67 were dried at 180° C. and 0.01 mmHg for 2 hours. The dried mixture was extruded through a T-die at 290° C. to form a film having a thickness of 0.02 mm. The film was colored black with a strong tint of blue.

EXAMPLE 6

99.9 Parts of black pellets of nylon 6 (density 1.14; m.p. 210°–215° C.) containing 2% of a carbon black pigment was uniformly blended with 0.1 part of substituted copper phthalocyanine dyestuff of the formula

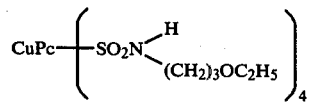

and the blend was spun at 260° C. and drawn to form nylon multifilaments having a side of 2 denier. The filaments were colored bluish black with no tint of red.

EXAMPLE 7

The procedure of Example 6 was repeated except that substituted copper phthalocyanate dyestuff having the formula

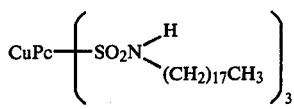

was used instead of the substituted copper phthalocyanine dyestuff used in Example 6. The color of the resulting nylon multifilaments was bluish black.

EXAMPLE 8

18 Parts of a carbon black pigment, 2 parts of substituted copper phthalocyanine dyestuff of the formula

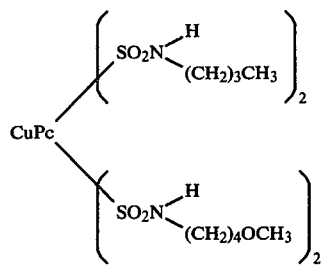

and 80 parts of polystyrene (general grade, melt index 0.5) were uniformly mixed, and extrusion-molded at 220° C. to form a pelletized master batch.

Four parts of the pelletized master batch was uniformly mixed with 96 parts of uncolored polystyrene, and the mixture was molded into a plate at 230° C. The color of the plate was black with a strong tint of blue.

EXAMPLE 9

The procedure of Example 8 was repeated except that substituted copper phthalocyanine dyestuff of the formula

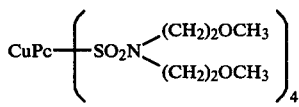

was used instead of the substituted copper phthalocyanine dyestuff. The color of the resulting polystyrene plate was black with a strong tint of blue.

EXAMPLE 10

19 Parts of a carbon black pigment, 1 part of substituted copper phthalocyanine dyestuff of the following formula

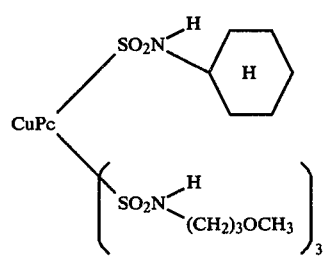

and 80 parts of ABS resin (melt index 15.3) were uniformly mixed, and the mixture was extrusion-molded through a screw extruder at 220° C. to form a pelletized master batch.

Five parts of the pelletized master batch was uniformly mixed with 95 parts of ABS resin, and molded into a plate at 250° C. The color of the plate was bluish black.

EXAMPLE 11

The procedure of Example 10 was repeated except that substituted copper phthalocyanine dyestuff of the formula

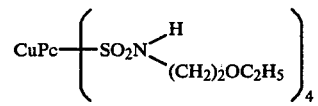

was used instead of the substituted copper phthalocyanine dyestuff used in Example 10. The color of the resulting ABS resin plate was bluish black.

EXAMPLE 12

0.5 Part of a carbon black pigment, 0.1 part of substituted copper phthalocyanine dyestuff of the formula

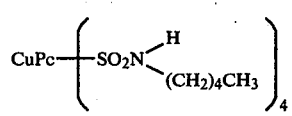

and 100 parts of nylon-12 (density 1.08, m.p. 180°–190° C.) were uniformly mixed. The mixture was extrusion-molded at 240° C. to form colored pellets. The colored pellets were dried at 80° C. for 5 hours, and molded into a plate at 260° C. The color of the plate was black with a strong tint of blue.

EXAMPLE 13

One part of a carbon black pigment, 0.15 part of substituted copper phthalocyanine dyestuff of the formula

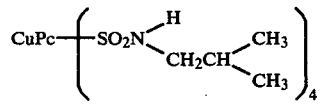

and 100 parts of AS resin (melt index 3.3) were uniformly mixed, and extrusion-molded at 220° C. to form colored chips. The chips were dried at 80° C. for 5 hours, and molded at 240° C. into a plate. The color of the plate was bluish black.

EXAMPLE 14

99.9 Parts of black pellets of nylon-66 (density 1.14, m.p. 250°–260° C.) containing 2% of a carbon black pigment was dried, and uniformly blended with 0.1 part of substituted copper phthalocyanine dyestuff of the formula

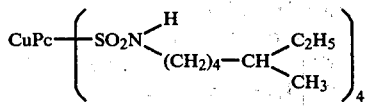

and the blend was spun at 285° C. and drawn to form nylon multifilaments having a size of 2 denier. The color of the multifilaments was bluish black.

What is claimed is:

1. A method for mass coloring a thermoplastic resin with a carbon black pigment, which comprises conjointly using a sulfonamide-substituted metal phthalocyanine dyestuff expressed by the general formula

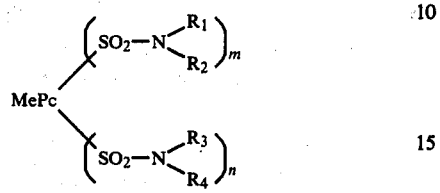

wherein MePc is a metal phthalocyanine residue, $R_1$ is a hydrogen atom or an alkyl group, $R_2$ is an alkyl group, $R_3$ is a hydrogen atom or an alkoxyalkyl group, $R_4$ is an alkoxyalkyl group, m is an integer of 0 to 4, n is an integer of 0 to 4, and m+n is an integer of 1 to 4, thereby to remove a reddish hue peculiar to coloration by carbon black.

2. The method of claim 1 wherein in the formula expressing the sulfonamide-substituted metal phthalocyanine dyestuff, $R_1$ is a hydrogen atom or an alkyl group having 1 to 30 carbon atoms, $R_2$ is an alkyl group having 1 to 30 carbon atoms, $R_3$ is a hydrogen atom or an alkoxyalkyl group having 3 to 34 carbon atoms in total with the alkoxy moiety having at most 30 carbon atoms, and $R_4$ is an alkoxyalkyl group having 3 to 34 carbon atoms in total with the alkoxy moiety having at most 30 carbon atoms.

3. The method of claim 1 wherein in the formula expressing the sulfonamide-substituted metal phthalocyanine dyestuff, $R_1$ is a hydrogen atom or an alkyl group having 1 to 18 carbon atoms, $R_2$ is an alkyl group having 1 to 18 carbon atoms, $R_3$ is a hydrogen atom or an alkoxyalkyl group having 3 to 22 carbon atoms in total with the alkoxy moiety having 1 to 18 carbon atoms, and $R_4$ is an alkoxyalkyl group having 3 to 22 carbon atoms in total with the alkoxy moiety having 1 to 18 carbon atoms.

4. The method of any one of claims 1 to 3 wherein the amount of the sulfonamide-substituted phthalocyanine dyestuff is 2 to 50% based on the weight of the carbon black pigment.

5. The method of claim 4 wherein in the formula expressing the sulfonamide-substituted metal phthalocyanine dyestuff, MePc is a copper phthalocyanine residue.

6. The method of claim 1 wherein the thermoplastic resin is a polyamide, an aromatic linear polyester or a styrene polymer.

7. The method of claim 1 for mass coloring a thermoplastic resin in a black color wherein the amount of the sulfonamide-substituted metal phthalocyanine dyestuff is about 5 to 8% by weight based on the carbon black pigment.

8. The method of claim 1 for mass coloring a thermoplastic resin with a black color with a strong tint of blue wherein the amount of the sulfonamide-substituted phthalocyanine dyestuff is 10 to 20% by weight based on the weight of the carbon black pigment.

9. The method of claim 1 for mass coloring a thermoplastic resin in a deep bluish black color wherein the amount of the sulfonamide-substituted phthalocyanine dyestuff is about 20 to 50% by weight, based on the weight of the carbon black pigment.

10. The method of claim 1 wherein the sulfonamide-substituted phthalocyanine dyestuff is a member selected from the group consisting of

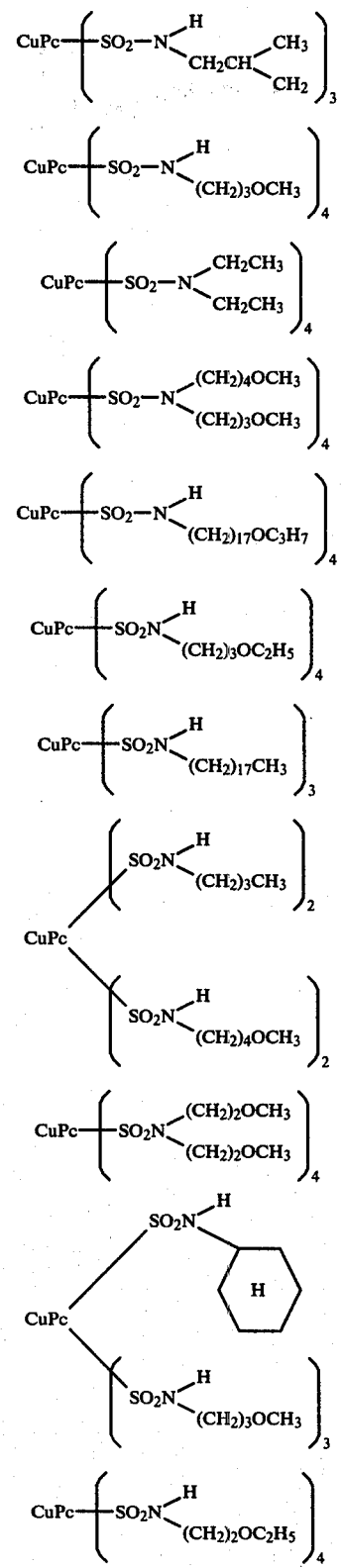

-continued
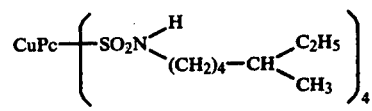
and
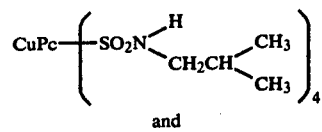
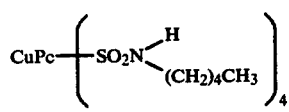
* * * * *

UNITED STATES PATENT AND TRADEMARK OFFICE
CERTIFICATE OF CORRECTION

PATENT NO. : 4,208,318
DATED : June 17, 1980
INVENTOR(S) : Ono, et al.

It is certified that error appears in the above—identified patent and that said Letters Patent is hereby corrected as shown below:

Please add the following:

[30]  Foreign Application Priority Data

June 16, 1977 [JP]   Japan        52-70518

Nov. 26, 1977 [JP]   Japan        52-141134

Signed and Sealed this

Twenty-fifth Day of November 1980

[SEAL]

Attest:

SIDNEY A. DIAMOND

Attesting Officer          Commissioner of Patents and Trademarks